United States Patent [19]

Kuhn et al.

[11] Patent Number: 4,989,398
[45] Date of Patent: Feb. 5, 1991

[54] HUBLESS SHEAVE AND SPINDLE

[75] Inventors: John B. Kuhn, Rubicon; Christopher S. Thorman, Beaver Dam, both of Wis.

[73] Assignee: Deere & Company, Moline, Ill.

[21] Appl. No.: 417,984

[22] Filed: Oct. 6, 1989

[51] Int. Cl.⁵ .............................................. A01D 45/02
[52] U.S. Cl. ....................................... 56/17.5; 474/199
[58] Field of Search ........................ 56/17.5, 16.7, 235, 56/255, 256, 295, DIG. 20; 301/126, 131, 132; 474/199

[56] References Cited

U.S. PATENT DOCUMENTS

| | | | |
|---|---|---|---|
| 3,875,728 | 4/1975 | Bacon | 56/17.5 |
| 3,916,706 | 4/1975 | Shaw | 474/199 |
| 4,478,029 | 10/1984 | Moore et al. | 56/17.5 |

Primary Examiner—Thuy M. Bui

[57] ABSTRACT

A belt driven rotary mower spindle and sheave assembly having a plurality of bushings, spacers and bearings compressed with the sheave on the spindle between a nut and a support or shoulder portion of the spindle. Rotational movement of the belt driven sheave is thereby frictionally transferred to the spindle. The assembly is carried within a housing on a mower deck, and a rotary cutting device is fixed to the lower end of the spindle.

13 Claims, 1 Drawing Sheet

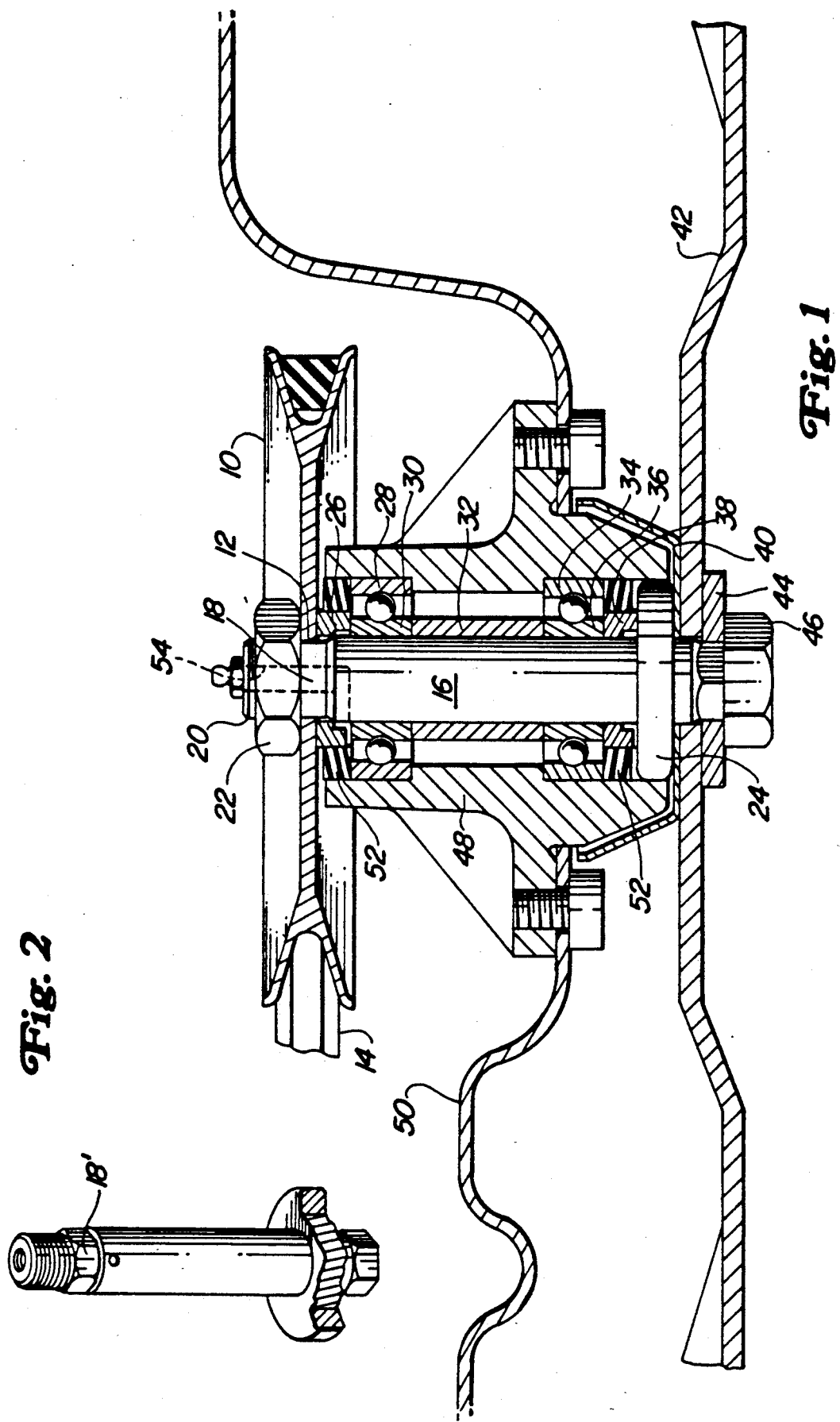

HUBLESS SHEAVE AND SPINDLE

BACKGROUND OF THE INVENTION

1. Field of the Invention

The invention relates to a belt driven spindle and sheave mechanism as used in multi-spindle mowers.

2. Description of the Related Art:

The invention relates to blade drive mechanisms for mowers and, more specifically, to belt driven spindle and sheave arrangements for multi-spindle mower decks. Conventional mowers provide an engine or motor which drives a belt. This belt engages and drives a pulley or sheave mounted on the upper portion of a shaft or spindle. The spindle is rotatably supported by bearings within a housing carried by the mower deck or frame. The lower portion of the spindle extends below the housing and has a mower blade mounted thereto for rotation with the spindle.

In conventional belt driven mowers, a cylindrical hub is welded to the sheave at its center. The hub is then placed over the spindle. A keyway is formed in the hub and spindle such that when a key is placed in the keyway, the spindle is thereby fixed for rotation with the hub and sheave. Threads are formed on the spindle above the hub such that a nut can be placed on the spindle in contact with the hub to keep the hub from coming off the upper end of the spindle.

A second embodiment of the prior art comprises a belt engaging sheave having a toothed or splined opening at its center. A first bushing with teeth or splines that correspond to those in the opening of the sheave is positioned on the spindle. A keyway is formed in the first bushing and the spindle such that when a key is placed in the keyway, the spindle and first bushing will rotate together. The sheave is placed on the first bushing such that as the sheave is rotated by the belt, the teeth in the sheave confront the teeth in the first bushing and rotate the first bushing and spindle. Threads are formed in the spindle above the sheave such that when a washer and nut are placed on the threads, the sheave and first bushing remain on the spindle.

A third embodiment of the prior art, as described in U.S. Pat. No. 3,916,706 comprises a sheave engaging hub that has a flattened portion in its center opening. The flattened portion engages a corresponding flattened portion of the spindle during operation, which keeps the spindle fixed for rotation with the hub and sheave.

In these conventional mowers, the hub or toothed bushing rides in contact with a second bushing. The second bushing is mounted on the spindle and rides on the inner race of a first bearing. The bearing supports the spindle for rotation about its axis. A spacer is placed on the spindle between the first bearing and a second bearing. Several mechanisms are mounted on the spindle beneath the second bearing that serve to carry the mower blade, shield the contents of the housing from debris, and create a seal for the bearings.

Such conventional spindle and sheave constructions serve to fix the spindle to the sheave for rotation therewith. For the motor and drive belt to rotate the blade, the spindle must be fixed to the sheave and not slip thereon. Also, during mower operations the blade may encounter large objects such as stones or thick vegetation that can retard or prevent rotation of the blade and therefore prevent the spindle from rotating. If the spindle rotation is stopped, but the drive belt continues to power the sheave carried on the spindle, the structure used to secure the sheave to the spindle for rotation therewith may fail. To prevent such failures keys, keyways and/or welds have been used between the sheave and spindle. If the spindle is not tightly secured to the sheave and rotates relative to the sheave when the blade encounters thick vegetation, the vegetation may be improperly cut. The relative motion between the spindle and sheave due to impact loading from large objects such as stones or stumps can cause wearing of contact surfaces within the mechanism and may result in the early failure of the mechanism.

It is therefore desirable to provide a mechanism which meets the need for fixing the spindle to the sheave during initiation of operation and during operation as impact loads are imparted to the mower blade.

A main disadvantage of these conventional sheave and spindle mechanisms is their cost of manufacture and assembly. In the conventional welded hub mechanism, the hub and key must be manufactured. The hub must be welded to the sheave which is time consuming and expensive. The keyway must be formed in the hub and spindle, and the key placed therein, all of which are costly processes. Similarly, in the second conventional mechanism, involving the toothed bushing, the toothed bushing and key are separately manufactured. The keyway must be formed in the toothed bushing and the spindle and the key placed therein. Therefore, it would be desirable to provide a reliable spindle and sheave construction that alleviates keys, keyways and/or welding to secure the sheave to the spindle and one which also involves few parts and is inexpensive to manufacture and assemble.

Because of the number of parts used in conventional mechanisms to fix the spindle to the sheave for rotation therewith, there is potential for inaccuracies in their operation. The hub of the conventional mechanism is welded to the sheave. This is a potentially inaccurate process that may cause the hub to be mounted in a non-perpendicular manner with respect to the plane of the sheave. Also, an inaccurate weld may cause the hub to be mounted off-center within the sheave. Even if welded perfectly, the hub may introduce additional inaccuracies due to the tolerances between hub outer diameter plus the hub inner diameter and clearance between the hub and its mating parts. The conventional mechanisms utilizing toothed bushings similarly involve the potential for inaccuracies. The cumulative effect of the manufacturing tolerances of the toothed opening in the sheave, the teeth of the bushing, the hole in the center of the bushing and the spindle can result in the spindle and sheave being eccentrically mounted. The cumulative effect of the tolerances may also result in the spindle being fixed in a non-perpendicular manner with respect to the sheave. Such eccentric and non-perpendicular mounting of the spindle may result in a whipping effect in the belt which contributes to belt wear. Idler pulleys and tensioner pulley mechanisms compensate for and accommodate belt whip, causing noise and vibration of the vehicle. Therefore, it is desirable to provide a mechanism for accurately assembling and mounting the spindle within the sheave such that belt deterioration, vibration and noise caused by belt whip are reduced.

The spindle of the conventional mechanism is vertically fixed within the bearings. To accomplish this fixed position, the spindle is force fitted through the inner race of the bearing which imparts an impact load on the ball bearings and the surfaces with which the ball bearings have contact. The impact of the ball bearings against the inner and outer races of the bearing can cause dents or dimples to form in the races where the impact occurs. These dents within the bearing races can contribute to the deterioration and early failure of the bearing. Therefore, it is desirable to provide a spindle and sheave arrangement that does not require the spindle to be force fitted through the bearings.

SUMMARY OF THE INVENTION

According to the present invention, there is provided an improved sheave and spindle assembly for a belt driven rotary mower.

Objects of the invention include providing a spindle and sheave assembly that will allow the spindle to remain operatively fixed to the sheave for rotation during initiation of operation and when the blade encounters impact during operation, reduces the mechanism's cost of manufacture and assembly, improves the manufacturing and assembly tolerances of the mechanism to reduce noise and vibration, and eliminates the need for force-fitting the spindle through the inner race of a bearing.

These and other objects are realized by a sheave and spindle assembly comprising a clamping mechanism for operatively pressing the sheave onto a shoulder or support portion formed as part of the spindle to such an extent that the sheave is fixed for rotation with the spindle. The preferred embodiment comprises a spindle with threads formed at one end that engages a nut. The nut abuts and presses against the sheave, which presses against a series of spacers, bushings, and inner races of bearings. These compressed elements are operatively pressed against a shoulder portion that protrudes from the spindle. A mower blade is fixed to the lower end of the spindle for rotation therewith.

BRIEF DESCRIPTION OF THE DRAWINGS

FIG. 1 is a partial sectional view of the spindle and sheave assembly.

FIG. 2 is a perspective view of the spindle with a hex shaped neck portion.

DESCRIPTION OF THE PREFERRED EMBODIMENT

Referring now to the drawings, and particularly FIG. 1, there is shown a belt engaging spindle and sheave arrangement. A sheave structure or sheave 10 having a round shaped opening 12 at its center is driven by a belt 14. An elongated shaft or spindle 16 is positioned perpendicular to the pulley or sheave 10 within the opening 12 in the sheave 10. A neck portion 18 of the spindle 16 is carried within the opening 12 in the sheave 10 during operation. Threads 20 are formed on the spindle 16 above the neck portion 18. A nut 22 engages the upper surfaces of the threads 20 and abuts the sheave 10. A support or shoulder portion 24 is integrally formed on the lower portion of the spindle 16. Placed around the spindle 16 and beneath the sheave 10 is a first bushing 26. A first bearing 28 is positioned around the spindle 16 such that the inner race 30 of the first bearing 28 is in contact with the first bushing 26. A spacer 32 is positioned around the spindle 16 between the first bearing 28 and a second bearing 34. The inner race 36 of the second bearing 34 is in contact with the spacer 32 and a second bushing 38 that is below the bearing 34. The second bushing 38 is carried by the shoulder portion 24 of the spindle 16. Together, the first bushing 26, inner race 30 of the first bearing 28, spacer 32 and inner race 36 of the second bushing 38 form a compression column which supports the sheave 10 on the shoulder 24.

A shielding cup 40, mower blade 42, and washer 44 are held against the under side of the shoulder portion 24 by a bolt 46 that engages the spindle 16 as described in U.S. Pat. No. 4,478,029.

A housing 48 carries the bearings 28, 34 and is mounted on a mower deck or frame 50. Seals 52 are placed between the bushings 26, 38 and the housing 48 to keep debris away from the bearings 28, 34. A passage 54 is defined through the top of the spindle 16 and extends downwardly to allow for lubrication of the bearings 28, 34.

Alternative embodiments of the present invention include variations in the placement and number of bushings 26, 38, spacers 32, and bearings 28, 34. For example, the invention may be alternatively assembled using two spacers, or with only one bearing and without a spacer 32. Similarly, alternative embodiments of the shoulder portion 24 include a multitude of protruding shapes as well as recessed features integral with or fixed to the spindle.

Next, the assembly and operation of the sheave and spindle mechanism will be explained. The material properties of the spindle 16 allow the nut 22 to be tightened on the threads 20 against the sheave 10 to approximately 160 foot pounds. The nut 22 presses the sheave 10 down onto the first bushing 26, which presses down on the inner race 30 of the first bearing 28. The inner race 30 of the first bearing 28 then presses down against the spacer 32, which in turn presses down on the inner race 36 of the second bearing 34. The second bearing's inner race 36 presses down against the second bushing 38, which abuts against the shoulder portion 24 of the spindle 16. Therefore, the sheave 10, first bushing 26, inner race 30 of the first bearing 28, spacer 32, inner race 36 of the second bearing 34 and second bushing 38 are all put in compression between the nut 22 and the shoulder portion 24. The friction between these members is great enough that the spindle 16 is operatively fixed for rotation with the sheave 10. As the sheave 10 is rotated by the driving belt 14, its rotative movement is transferred by friction through the compressed members to the shoulder portion 24. The shoulder portion 24 and spindle 16 are thereby caused to rotate, and since the mower blade 42 is fixed to the spindle 16, the blade 42 also rotates. Therefore, the friction between the nut 22, compressed members 26, 30, 32, 36 and 38 and shoulder 24 serve to fix the sheave 10 to the spindle 16. A similar transfer of force through friction occurs through the nut 22 above the spindle 16. The friction between the nut 22 and the sheave 10 causes the nut 22 to be effectively fixed for rotation with the sheave 10. Since the nut is fixed for rotation with the spindle due to the threads on which the nut is mounted the spindle is thereby caused to rotate as the nut rotates. Therefore, the second component of torque transfer occurs between the sheave 10, the nut 22 and the spindle 16.

An alternative embodiment is illustrated in FIG. 2 for providing a third source of torque transfer between the sheave 10 and spindle 16. This source includes a hex feature of a sheave opening with a mating neck portion 18' formed on the spindle 16. As the sheave 10 rotates, the hex shaped opening at the center of the sheave 10 engages the hex shape formed in the neck portion 18' of the spindle 16, causing the spindle 16 to rotate as the sheave 10 rotates.

The sheave and spindle mechanism of the present invention, therefore, meets the need for fixing the spindle to the sheave for rotation therewith, and requires few parts to manufacture and assemble, which allows for inexpensive production of the mechanism. Since the number of parts is reduced and the weld is eliminated, the corresponding inaccuracies that contribute to noise and vibration are eliminated. Also, the spindle 16 is held fast within the inner races 30, 36 of the bearings 28, 34 by the friction between the compressed members. This eliminates the necessity of force fitting the spindle 16 through the inner race 30 of the bearing 28 and thereby increases the working life of the bearing 28.

We claim:
1. A mower having:
   frame means including a housing;
   a power source such as a motor or engine carried by the frame;
   belt means driven by the power source;
   sheave structure that engages and is driven by the belt means, said sheave structure having a generally circular opening through its center;
   a spindle having a neck portion of generally circular cross section positioned within the opening in the sheave structure, said neck portion being capable of rotation within the opening int the sheave structure and relative to the sheave structure;
   support means rotatable with and positioned on the spindle, said support means being spaced from the neck portion of the spindle;
   bearing means carried by the housing for supporting the spindle for rotation about the spindle's longitudinal axis;
   a rotary cutting means fixed to the spindle for rotation therewith; and
   clamping means for frictionally securing the sheave structure for rotation with the support means, said clamping means being effective to frictionally mount the sheave structure to the support means to prevent rotation of the sheave structure relative to the spindle.

2. The invention according to claim 1 wherein the clamping means comprises:
   threads formed in the spindle; and
   a nut that engages the threads of the spindle and that operatively abuts the sheave structure such that the sheave structure is pressed against the support means to an extent that the spindle is frictionally mounted for rotation with the sheave structure.

3. The invention of claim 2, wherein the sheave structure comprises a pulley being compressed between and in direct abutment with the nut and the support means.

4. The invention according to claim 1 wherein the clamping means comprises:
   threads formed in the spindle;
   a nut that engages the threads of the spindle and that operatively abuts the sheave structure and
   at least one spacer means positioned in compression between the sheave structure and the support means.

5. The invention according to claim 4 wherein:
   the spacer means and the inner race of the bearing means are positioned on the spindle in compression between the sheave structure and the support means.

6. The invention according to claim 4 wherein the nut is tightened on the spindle sufficient to place the spindle under tension.

7. The invention according to claim 1 wherein:
   the support means comprises a portion of the spindle having a larger effective diameter than the neck portion.

8. A spindle mechanism as used in the mowing of vegetation and rotatably received by a housing, said spindle mechanism comprising:
   a spindle rotatably received within the housing and having a radially extending shoulder portion;
   a sheave structure slidably received on said spindle, said sheave structure having first and second spaced apart and radially extending surfaces;
   spacer means receivable on the spindle between the radially extending shoulder portion of the spindle and the first surface of the sheave structure, and
   tightening means receivable on the spindle and abuttable with the second surface of the sheave structure, said tightening means being effective to frictionally engage the second surface of the sheave structure, whereby the first surface of the sheave structure compressibly engages the spacer means to force it against the radially extending shoulder portion of the spindle and secure the sheave structure against rotation about the spindle.

9. The invention of claim 8, wherein the tightening means further includes:
   threads formed on the spindle, and
   a nut engagable with the threads for operatively abutting the second surface of the sheave structure.

10. The invention of claim 9 wherein the sheave structure is a pulley compressed between and in direct abutment with the nut and the spacer means.

11. The invention of claim 8, further including mating surfaces formed integral with and engagable between the spindle and the sheave structure for supplementally securing the sheave structure for rotation with the spindle.

12. The invention of claim 11, wherein the mating surfaces include a portion of the spindle having a hex shaped cross section, said portion being received within a hex shaped opening in the sheave structure.

13. The invention of claim 11 wherein the sheave structure is a pulley compressed between and in direct abutment with the nut and the spacer means.

* * * * *